Nov. 15, 1955     C. H. WILLSEY     2,723,695
MECHANISM FOR SEPARATING EGG WHITES FROM EGG YOLKS
Filed April 6, 1953     2 Sheets-Sheet 1
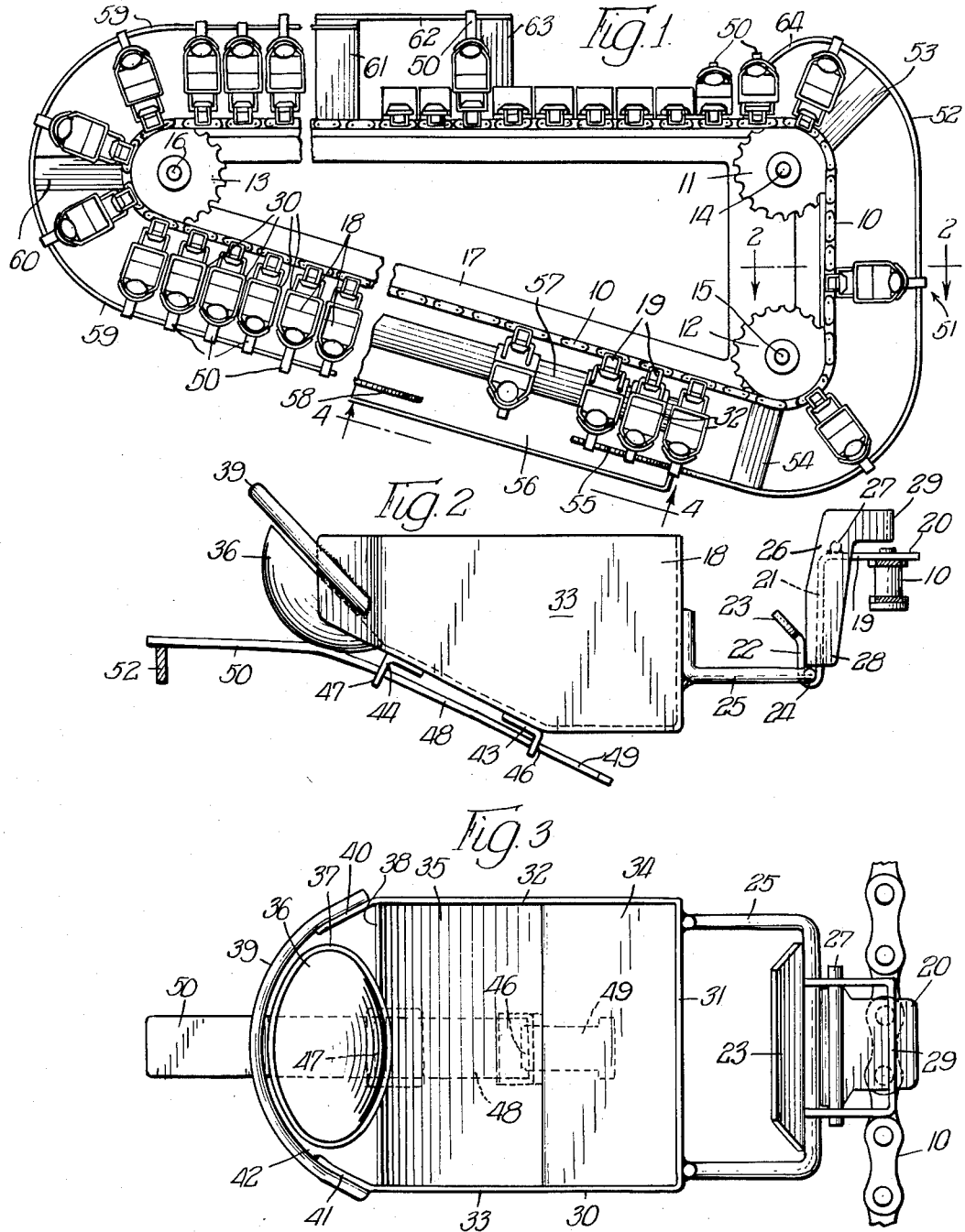
INVENTOR.
Charles H. Willsey,
BY
Cromwell, Greist + Warden
Attys.

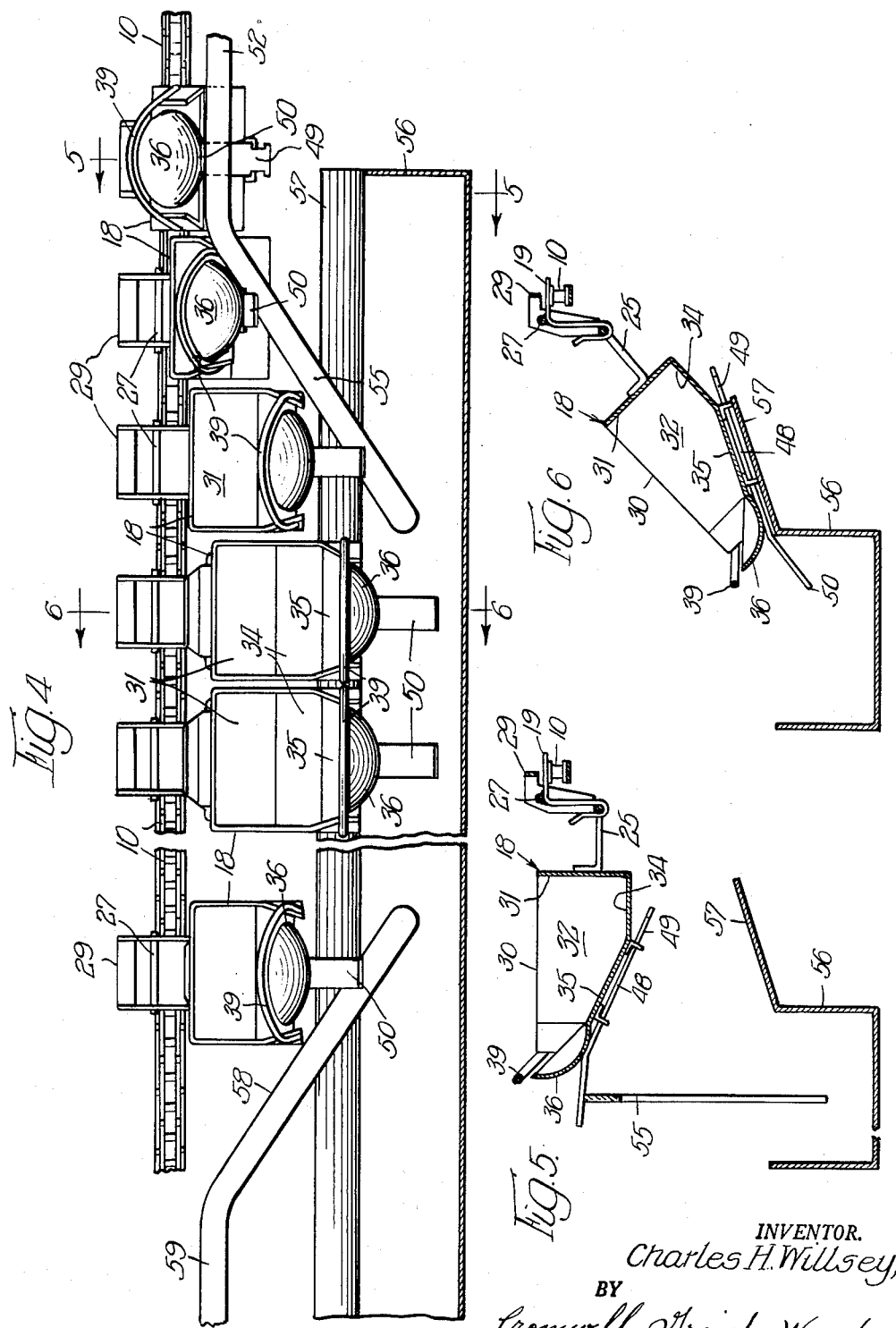

United States Patent Office 2,723,695
Patented Nov. 15, 1955

2,723,695

MECHANISM FOR SEPARATING EGG WHITES FROM EGG YOLKS

Charles H. Willsey, Topeka, Kans.

Application April 6, 1953, Serial No. 346,933

22 Claims. (Cl. 146—2)

This invention relates to egg handling apparatus and is more particularly concerned with improvements in mechanism for receiving from a mechanical egg breaking device the contents of successive eggs and for separating the whites from the yolks.

Egg breaking machines have heretofore been developed which have incorporated mechanism for breaking or cracking successive eggs at a cracking station, for separating the broken or cracked shell portions of each egg and for delivering the contents by gravity to a mechanism which thereafter separates the albumen from the yolk and delivers the albumen and the yolk into separate containers. Difficulty has been encountered in many prior machines of this type in providing an efficient and satisfactory mechanism for separating the egg whites or albumen from the yolks and the present invention is designed to provide an improved mechanism for rapidly and efficiently accomplishing this separating operation.

It is a general object of the present invention to provide an improved mechanism, adapted to be incorporated in an egg breaking machine, for receiving the egg contents from the broken shell portions of each successive egg and for thereafter separating the egg white from the yolk and for depositing the egg white and the yolk in separate containers and which will operate in an efficient and rapid manner, with a minimum of ruptured yolks.

It is a more specific object of the invention to provide an egg contents separating mechanism adapted for use in an egg cracking machine which is simple in construction and efficient in operation, which will separate the whites from the yolks in a relatively short period of time, and which can be readily cleaned and maintained in a highly sanitary condition during its operation.

It is a further object of the invention to provide an egg contents separating mechanism which comprises a conveyor having mounted in pivoted relation thereon a plurality of containers for receiving, at a cracking station, the contents of successive broken eggs and for carrying the same away from the cracking station along a predetermined path, with mechanism along the path of travel of the containers for first pivoting the containers to separate the whites from the yolks, with the separated whites being deposited in a suitable receptacle, and for thereafter dumping the yolks into another receptacle as the containers advance along a further portion of the path of movement thereof.

It is another object of the invention to provide a mechanism for separating egg whites and yolks which comprises a plurality of receptacles mounted on an endless conveyor, each of the receptacles comprising a base portion or pan for receiving the whole egg contents and a yolk cup arranged in angular relation to the base portion along an open edge of the base portion, the yolk cup being of a size sufficient to receive the yolk and having a free edge portion at the top thereof which permits the white to be drained thereover into a collecting receptacle arranged beneath the conveyor when the receptacle is moved to a predetermined point along the path of travel of the conveyor.

It is a still more specific object of the invention to provide an egg contents receiving receptacle adapted to be detachably supported in pivoted relation on a continuous conveyor which receptacle comprises a base pan for receiving the combined yolk and white as it is dumped from the shell portions of a broken egg and a yolk cup arranged in angular relation along an open outer edge of the base pan, with the yolk cup being so related to the pan that the receptacle may be tilted to an angle in which the egg contents will slide over the outer edge of the base pan and the yolk will be received in the yolk cup while the white will drain down over free portions of the edge of the cup, with the cup having apertures or slots arranged at the top edge thereof to permit adequate clearance for gravity separation of the egg white from the yolk.

These and other objects of the invention will be apparent from a consideration of the separating mechanism which is shown by way of illustration in the accompanying drawings, wherein:

Fig. 1 is a plan view of a separating conveyor having incorporated therein mechanism embodying the principal features of the invention, with portions thereof broken away;

Fig. 2 is a section taken on the line 2—2 of Fig. 1, to an enlarged scale, and showing in elevation, one of the egg separating receptacles;

Fig. 3 is a plan view, to an enlarged scale, of the egg separating receptacle shown in Fig. 2;

Fig. 4 is a side elevation, to an enlarged scale, of a portion of the conveyor of Fig. 1, the view being taken on the line 4—4 of Fig. 1 and portions of the mechanism being broken away;

Fig. 5 is a section taken on the line 5—5 of Fig. 4; and

Fig. 6 is a section taken on the line 6—6 of Fig. 4.

The present mechanism may be employed in connection with any suitable cracking mechanism in which successive eggs are brought up to a cracking station, each successive egg is cracked and the shell separated into two portions permitting the contents to be dumped or allowed to fall by gravity into a receptacle positioned beneath the same, the receptacle being mounted on a suitable conveyor which moves it up to the cracking station to receive the whole egg contents and then moves it away along a predetermined path while simultaneously moving a successive receptacle up to the cracking station to receive the contents of the next egg.

Referring to Fig. 1, the conveyor illustrated comprises an endless chain 10 which is mounted on sprockets 11, 12 and 13, arranged in triangular relation. The sprockets 11, 12 and 13 are supported on vertically extending shafts 14, 15 and 16 which are journaled in a suitable frame structure 17. The conveyor carries a plurality of egg receiving receptacles 18 which are pivotally mounted on the chain 10 and extend outwardly thereof.

Each of the receptacles 18 is detachably supported on the chain 10 by means of a bracket 19. The bracket 19 (Figs. 2 and 3) includes a plate-like base having a horizontal portion 20 permanently secured to the top of a link of the conveyor chain 10 and a vertical portion 21 depending therefrom in outwardly spaced relation to the chain 10. The vertical base portion 21 terminates in a reversely bent, upwardly extending, outer flange portion 22 having a flared end 23, which provides, with the base portion 21, an upwardly opening pocket or recess 24 for receiving a bale 25 attached to the receptacle 18. A latching member 26 is provided on the bracket 19 which is pivotally mounted at 27 on the base plate 20. The latching member 26 is generally U-shaped with depending legs 28 and an upward and rearwardly extending bight portion 29 which serves as a handle for pivoting the legs 28 about the pivot 27 and out of latching relation in which they are normally positioned by gravity and in which they prevent removal of the bale 25 from the pocket 24 in which it is received. The latch members 26 may be readily swung about their pivots 27 to permit removal of the individual receptacles 18 from the conveyor.

Each of the receptacles 18 comprises a pan-like base portion 30 which includes an upstanding rear end wall 31, upstanding side walls 32 and 33, and a bottom wall having a horizontal rear portion 34 and an upwardly and outwardly sloping forward portion 35 which terminates at the outer open end of the member 30. A yolk cup 36 is secured at the outer open end of the forward base portion 35 with a portion of the periphery of the upper edge 37 thereof secured to the outer edge 38 of the bottom wall portion 35. The yolk cup 36 is arranged at an angle which brings the top edge 37 thereof into a plane extending outwardly and upwardly relative to the plane of the bottom portion 35. A rod-like guard member 39 of substantially the same curvature as the top edge 37 of the yolk cup 36 is arranged in outwardly spaced relation to the outer side of the edge 37 of the cup 36 and the ends thereof are secured to angular extensions 40 and 41 on the side walls 32 and 33 of the receptacle 18 which extend outwardly of the edge 38 of the bottom wall portion 35. The arrangement of the guard member 39, the yolk cup 36 and the forward edge 38 of the bottom member 35 is such that sufficient space is allowed around the major portion of the top edge 37 of the yolk cup 36 to permit the egg white to drain down around the edge 37 of the cup 36 when the egg contents is moved from the bottom portion 34 of the receptacle 18 over the bottom portion 35 to the yolk cup 36, the latter being of sufficient size to receive the yolk but not the white.

A pair of spaced angle brackets 43 and 44 are arranged on the lower surface of the bottom forward wall portion 35 and provided with guideway forming slots or recesses 46 and 47 which receive in sliding relation therein a strap member 48. The strap member 48 has a portion 49 of reduced width at its inner end which is received in the guideway forming slot 46 and limits the movement thereof. The strap member 48 has an outer end portion 50 which is bent at a slight angle to the body of the strap and which forms a handle for sliding the strap in the guideway forming slots 46 and 47 in the supporting brackets 43 and 44.

The receptacles 18 are detachably mounted on the conveyor chain 10 by the bail members 25 attached to the upstanding walls 31 and received in the brackets 19. They are carried by the conveyor chain 10 into position at a cracking station, indicated at 51 in Fig. 1, where each receptacle receives the contents of a broken egg. A receptacle supporting rail 52 is arranged on brackets 53 and 54 to support the receptacles 18 in normal horizontal position as shown in Fig. 2 by engagement beneath the projecting ends 50 of the strap members 48. As successive receptacles 18 are moved into position at the cracking station 51 they receive the egg contents from successive broken eggs, the combined egg white and yolk of a single egg being dumped into the tray portion 30 of each receptacle and falling initially on the bottom member 34. The receptacles 18 are retained by the rail 52 in a horizontal position along a portion of the path of movement thereof to permit visual inspection of the egg contents by the operator of the machine. During this movement, if the operator observes that an egg contents is spoiled, the receptacle 18 into which it has fallen may be readily detached from its supporting bracket 19 and removed from the conveyor 10. Also during this portion of the movement of the receptacles the strap or slide member 48 may be pulled out if the egg yolk is of a dark color and it is desired to separate it from the lighter colored yolks, provision being made, in a manner which will be described, for dumping the darker yolk at a different point in the path of travel of the receptacles.

As the receptacles 18 advance to a point beyond the inspection area they are supported in horizontal position by the rail 52 until they reach the separating area where the rail 52 terminates in a downwardly directed end portion 55 (Figs. 4 to 6). A collection pan or other receptacle 56 is positioned beneath the traveling receptacles 18 at this point along the conveyor and extends for a substantial distance beneath the same. As the receptacles 18 move along the rail end portion 55 they are allowed to tilt by the downward inclination of the rail end to a position where the upper edge 37 of the yolk cup 36 is substantially horizontal (Fig. 6). The receptacles 18 are supported in the tilted position on an upwardly inclined flange 57 extending along the rear edge of the pan 56 as they advance beyond the end of the rail portion 55. In this position the yolk cup 36 is substantially horizontal and receives the egg yolk while the egg white is free to spill over the peripheral edge 37 of the cup 36 and drain through the open space 42 between the edge 37 of the cup 36, the surrounding guard member 39 and the edge 38 of the bottom wall portion 35, of the receptacle 18. The egg white tends to cling to the surface of the flange 57 on which the receptacle 18 is riding which pulls the white away from the yolk as it spills over the edge of the yolk cup.

The receptacles 18 are moved for a short distance while in the tilted position until they reach a point in their path of movement where the end 50 of the strap 48 engages with an upwardly sloping end portion 58 of a supporting rail 59 which swings the receptacles 18 back into normal horizontal position. The collecting pan 56 for the egg white may be supported in any conventional manner (not shown) from the main frame of the machine or independently thereof beneath the path of movement of the receptacles 18 so that it may be readily removed at any time.

In the arrangement illustrated the rail 59 is supported by suitable brackets 60 and 61 from the conveyor frame 17, with the rail terminating at bracket 61 where the receptacles 18 may swing to a full vertical position for dumping the yolk from the yolk cup 36 provided the slide member 48 has not been pulled out to its extended position. A suitable chute or receptacle (not shown) is arranged beneath the conveyor at this point to receive the yolks. A short rail section 62 is arranged beyond the end of rail 59, which is supported on brackets 61 and 63 and which prevents dumping of those receptacles 18 in which the operator has moved the slide bar 48 to the outermost position. The extended end 50 of the slide bar 48 engages the rail section 62 until it reaches the end of the rail at supporting bracket 63, after which it swings downwardly to the vertical position to dump the yolk from the cup 36 into a second yolk receptacle (not shown) which is placed beneath the conveyor at this point. As the receptacles 18 approach the sprocket 11 they are swung upwardly into normal horizontal position by the upwardly extending end portion 64 of the rail 52.

The receptacle 18 as illustrated comprises the pan portion 30, the yolk cup 36 and the rod-like guard member 39 which are assembled in the relation shown and connected to each other. The receptacle 18 may be formed with these members or portions thereof made integral and with the space 42 provided by slots in the walls around the upper edge of the yolk cup which may be arranged as desired so long as sufficient clearance is provided for the white to drain therethrough and separate from the yolk when the egg contents is moved from the bottom of the pan portion of the receptacle to the yolk cup.

I claim:

1. An egg contents separating mechanism comprising a supporting structure, an endless conveyor mounted thereon and means for moving said conveyor in a predetermined horizontal path, a plurality of egg receiving receptacles pivotally mounted on said conveyor, means along said conveyor for supporting successive receptacles in a generally horizontal plane and thereafter in downwardly tilted relation to said horizontal plane as said receptacles move along said conveyor, said receptacles each comprising a body portion adapted to receive the egg contents while said receptacle is supported in the horizontal plane, said body portion having side walls with a portion thereof sloping outwardly and upwardly and terminating at a yolk receiving cup secured at its top edge to the outer edge of said sloping side wall portion whereby when said receptacle is supported on said supporting means in downwardly tilted relation said yolk cup will be positioned in a substantially horizontal plane and receive the egg yolk from the tilted body portion of the receptacle and cause the white to separate from the egg yolk by spilling over the free portions of the edge of said yolk cup and the free portions of the edge of said sloping side wall.

2. An egg contents separating mechanism comprising a supporting structure, an endless conveyor mounted thereon and means for moving said conveyor in a substantially horizontal plane, a plurality of egg receiving receptacles detachably and pivotally mounted in outwardly projecting relation on said conveyor for swinging movement downwardly of said horizontal plane, said receptacles each comprising a pan-like body portion adapted to receive the egg contents while said receptacle is supported in a horizontal plane, said body portion including an outwardly and upwardly sloping outer side wall and a yolk receiving cup at the outer edge of said sloping side wall whereby when said receptacle is swung downwardly through a predetermined angle said yolk cup will be positioned in a substantially horizontal plane to receive the egg yolk from the body portion of the receptacle and cause the white to separate from the yolk by spilling over the edges of said yolk receiving cup, and means at predetermined points along the path of said conveyor for supporting said receptacles in horizontal position while the egg contents is dumped therein and for thereafter supporting successive receptacles in a tilted position to permit separation of the whites from the yokes.

3. An egg contents separating mechanism comprising a supporting structure, an endless conveyor mounted thereon and means for moving said conveyor in a substantially horizontal plane, a plurality of egg receiving receptacles piovtally mounted on said conveyor for swinging movement downwardly of the horizontal plane, said receptacles each comprising a body portion adapted to receive the whole egg contents while said receptacle is supported in the normal position in a horizontal plane, said body portion including an outwardly and upwardly sloping outer side wall portion, and a yolk receiving cup secured at its uppermost edge to a portion of the outer edge of said sloping side wall, said yolk cup being at an angle to the horizontal plane in the normal position of the receptacle, whereby when said receptacle is swung downwardly through a predetermined angle said yolk cup will be positioned in a substantially horizontal plane to receive the egg yolk and cause the white to separate from the yolk by spilling over the free edge portions of said yolk cup and the free edge portions of the sloping side wall, and means at predetermined points along the path of said conveyor for supporting each receptacle in a normal horizontal position for receiving the contents of an egg and for thereafter supporting the receptacle in a tilted position to permit separation of the egg white from the yolk.

4. In an egg cracking machine having a cracking station, means adjacent said station for receiving the egg contents and for separating the yolks from the whites comprising an endless conveyor having a plurality of outwardly extending receptacles swingably mounted therealong, said conveyor being mounted to position successive receptacles at the cracking station for receiving the egg contents, said receptacles each comprising a pan portion and a yolk receiving cup, said pan portion being open at one side and said yolk cup being mounted at said open side at an angle to the bottom of said pan portion, a sectional receptacle supporting rail extending along predetermined portions of the path of said receiving conveyor for engaging and supporting said receptacles in a position to receive the egg contents in said pan portion thereof and means along said conveyor for supporting said receptacles in a predetermined downwardly tilted position to permit the egg contents in each receptacle to move from the bottom of the pan portion to the yolk cup with the yolk retained in said yolk cup and the white spilling out over the edges of said yolk cup.

5. In an egg cracking machine having a cracking station, means adjacent said station for receiving the egg contents and for separating the yolks from the whites comprising an endless conveyor, means for moving said conveyor in a horizontal plane, a plurality of outwardly extending receptacles swingably mounted on said conveyor, said conveyor being located to position successive receptacles at the cracking station for receiving the egg contents, said receptacles each comprising a pan-like portion and a yolk cup portion, said pan portion being open at the outer side and said yolk cup being arranged at said open side at an angle to said pan portion, a receptacle supporting member extending along a predetermined portion of the path of said conveyor for holding said receptacles in a position to receive the egg contents in said pan portion thereof and means adjacent the end of said supporting member for holding said receptacles in a tilted position to permit the egg contents in each receptacle to move from the pan-like portion to the yolk cup portion with the yolk retained in said yolk cup and the white spilling out over the top edges of said yolk cup.

6. In an egg cracking machine having a cracking station, means adjacent said station for receiving the egg contents and for separating the yolks from the whites comprising an endless conveyor, means for moving said conveyor in a predetermined path, a plurality of receptacles swingably mounted on said conveyor, said conveyor being arranged to position successive receptacles at the cracking station for receiving the egg contents, said receptacles each comprising a pan-portion and a yolk receiving cup portion, said pan portion having an open side and said yolk cup being arranged at said open side at an angle to the bottom of said pan portion, a member extending along a predetermined portion of the path of said conveyor for supporting successive receptacles in a position to receive the egg contents in said pan portion thereof and an egg white collecting receptacle having an angularly extending flange at the end of said member and along said conveyor for supporting said receptacles in a downwardly tilted position to permit the egg contents in each receptacle to move from the pan portion to the yolk cup with the yolk retained in said yolk cup and the white draining out over the edges of said yolk cup into said collecting receptacle.

7. A receptacle for an egg contents separating machine comprising a pan portion having a bottom and upstanding side walls partially surrounding said bottom, a yolk cup having the top edge adjoining said bottom and upwardly and outwardly inclined relative thereto, and means for pivotally supporting said receptacle whereby when the contents of an egg has been deposited therein said pan portion may be tilted downwardly to permit the egg contents to move from said bottom to said yolk cup, said yolk cup being of a size sufficient to receive the egg yolk and having a portion of its top edge unobstructed whereby the egg white will separate from the yolk by gravity and drain over the edge of said yolk cup.

8. A receptacle for an egg contents separating machine comprising a pan portion having a bottom and side walls partially surrounding said bottom, said bottom having a yolk cup formation at a free edge thereof, and means for pivotally supporting said pan portion whereby when the contents of an egg has been deposited therein said receptacle may be tilted to permit the egg contents to move over said bottom to said yolk cup formation, said yolk cup formation being of a size sufficient to receive the egg yolk and having top edge portions over which the egg white will drain and separate from the yolk by gravity.

9. A receptacle for an egg contents separating machine comprising a bottom and upstanding side walls forming a pan with an open outer side, a yolk cup having the top edge adjoining said bottom at the open outer side of said pan, means for pivotally supporting said pan from the side opposite said yolk cup, and means to pivot said pan whereby when the contents of an egg has been deposited in said pan it will tilt to permit the egg contents to move from said bottom toward said yolk cup, said yolk cup being of a size sufficient to receive the egg yolk and having an unobstructed passageway at the top edge thereof through which the egg white will pass and separate from the yolk by gravity.

10. A receptacle for an egg contents separating machine comprising a generally rectangular pan portion having a bottom, upstanding walls surrounding said bottom on three sides, a yolk cup having the top edge adjoining said bottom at the fourth side and upwardly and outwardly inclined relative thereto, and means for pivotally supporting said pan portion whereby when the contents of an egg has been deposited in said pan it may be tilted downwardly to permit the egg contents to move from said bottom toward said yolk cup, said yolk cup being of a size sufficient to receive the egg yolk and having portions of the top edge thereof free to permit passage of said egg white whereby said egg white will separate from the yolk by gravity and drain over the edge of said yolk cup.

11. A receptacle as recited in claim 10 and a bowed wire-like guard member having the ends thereof secured to the ends of the side walls of said pan portion, said guard member being spaced from the top edge of said yolk cup a sufficient distance to permit the egg white to pass therebetween.

12. A receptacle for an egg contents separating machine comprising a pan portion having a bottom, upstanding side walls partially surrounding said bottom with the outer end edges thereof in spaced relation, a yolk cup having a portion of the top edge thereof adjoining said bottom and extending between the outer end edges of said side walls, said yolk cup being upwardly and outwardly inclined relative to said bottom, a bowed wire guard member connected at its ends to the spaced ends of said side walls and extending in spaced relation above the outer top edge of said yolk cup, and means for pivotally supporting said pan portion whereby it may be tilted downwardly to permit the egg contents to move from said bottom toward said yolk cup, said yolk cup being of a size sufficient to receive the egg yolk when its top edge is tilted to a horizontal position and having a portion of its top edge unobstructed whereby the yolk will be received therein and the egg white will separate from the yolk by gravity and drain over the edge of said yolk cup.

13. In a mechanism for separating egg whites from the yolks, a conveyor, means for moving said conveyor in a predetermined path, a plurality of receptacles, each of said receptacles comprising a bottom and upstanding side walls forming a pan with an outer side open, a yolk cup having the top edge adjoining said bottom in angular relation thereto at the open outer side of said pan, means extending from the side opposite said yolk cup to swingably attach said pan to said conveyor, means along the path of said conveyor for supporting said pan in a horizontal position and thereafter in a tilted position whereby when the contents of an egg has been deposited in said pan and the receptacle is advanced by said conveyor it is tilted to position the yolk cup in a generally horizontal plane and to cause the egg contents to move from said bottom to said yolk cup, said yolk cup being of a size sufficient to receive the egg yolk and having an unobstructed passageway at the top edge thereof whereby the egg white will separate from the yolk by gravity and pass over the edge of said yolk cup.

14. A power driven conveyor, a plurality of egg contents separating receptacles swingably attached to said conveyor, each of said receptacles comprising a generally rectangular pan portion having a bottom, upstanding walls surrounding said bottom on three sides, a yolk cup having the top edge adjoining said bottom at the fourth side and upwardly and outwardly inclined relative thereto, and means along said conveyor supporting said pan portion in a horizontal position while the contents of an egg is deposited in said pan, means along said conveyor to support said pan as it is advanced thereby in a downwardly tilted position to cause the egg contents to move from said bottom to said yolk cup, said yolk cup being of a size sufficient to receive the egg yolk only and having portions of the top edge thereof free to permit passage of said egg white whereby said egg white will separate from the yolk by gravity and drain over the edge of said yolk cup, and a removable receptacle beneath said conveyor to receive said egg white.

15. An endless driven conveyor, a plurality of egg contents separating receptacles detachably and swingably mounted along said conveyor, a supporting member along said conveyor for supporting said receptacles in a horizontal position, said receptacles each comprising a pan portion having a bottom and side walls partially surrounding said bottom, said bottom having a yolk cup formation at a free edge thereof, said pan portion being adapted to receive the contents of an egg while it is in the horizontal position, said supporting member being interrupted to permit successive receptacles to be tilted for a sufficient period to cause the egg contents therein to move over said bottom to said yolk cup formation, said yolk cup formation being of a size sufficient to receive the egg yolk and having top edge portions over which the egg white will drain and separate from the yolk by gravtiy, while said pan portion is in the downwardly tilted position, and an egg white receiving receptacle removably positioned beneath the conveyor to receive the egg white as it drains from the receptacles.

16. A receptacle for an egg contents separating machine comprising a bottom and upstanding side walls forming a pan with an open outer side, a portion of said bottom being horizontal and an adjoining portion thereof sloping upwardly toward the open outer side, a yolk cup having a top edge joining the sloping portion of said bottom at said open outer side, means for pivotally supporting said receptacle at the side opposite said yolk cup, and means to pivot said receptacle after the contents of an egg has been deposited therein whereby to cause the egg contents to move from the horizontal portion of said bottom over the inclined portion thereof to said yolk cup, said yolk cup being of a size sufficient to receive the egg yolk and having an unobstructed passageway at the top edge thereof through which the egg white will pass and separate from the yolk by gravity.

17. In a mechanism for separating egg whites from the yolks, a conveyor, means for moving said conveyor in a predetermined path, a plurality of receptacles, each of said receptacles comprising a bottom and upstanding side walls forming a pan with an outer side open, said bottom having a portion thereof extending diagonally upward toward the open outer side, a yolk cup having a top edge connected to said bottom at the open outer side, means extending from the side opposite said yolk cup to swingably attach said receptacle to said conveyor, means along the path of said conveyor for supporting said receptacle in a horizontal position while the contents of an egg is dumped therein, an elongate egg white receiving trough positioned along said conveyor and having a slanted wall formation below said conveyor for supporting said receptacles in tilted relation as they move along said conveyor, said receptacles being tilted while they move in engagement with said trough wall at an angle to cause the egg contents to move from said bottom to said yolk cup, and said yolk cup being of a size sufficient to receive the egg yolk only and having an unobstructed passageway at the top edge thereof whereby the egg white will separate from the yolk by gravity and pass over the edge of the yolk cup onto the sloping wall formation of the white receiving trough.

18. A separating mechanism as recited in claim 17, and a slide member on each of said receptacles, said slide member benig movable from an extended position in which it engages said receptacle supporting means to a retracted position to permit the receptacle to swing free of said supporting means and dump the contents therefrom.

19. An egg contents separating mechanism comprising a supporting structure, a conveyor mounted thereon for operation in a generally horizontal plane, a plurality of egg receiving receptacles mounted on said conveyor for swinging movement from a laterally outwardly extending position to a downwardly swung position, means at predetermined points along the path of said conveyor for supporting said receptacles in outwardly extending position while the egg contents is dumped therein and for thereafter supporting the same in a downwardly swung position, said receptacles each comprising a body portion adapted to receive the egg contents while said receptacle is supported in a horizontal position, said body portion including an outwardly and upwardly sloping side wall portion terminating in a yolk receiving cup portion at its outer edge, whereby when said receptacle is supported by said supporting means in said downwardly swung position said yolk cup portion will be positioned in a substantially horizontal plane and receive the egg yolk from the body portion of the receptacle and the white will separate from the yolk by spilling over the free edges of said yolk cup portion.

20. An egg contents separating mechanism comprising a supporting structure, a conveyor mounted thereon and means for moving said conveyor in a predetermined path, a plurality of egg receiving receptacles swingably mounted on said conveyor, means adjacent said conveyor for holding the receptacles in a generally horizontal plane for a portion of their movement and thereafter in downwardly tilted relation to said horizontal plane, said receptacles each comprising a body portion adapted to receive the egg contents while said receptacle is supported in the horizontal plane, said body portion having an outwardly and upwardly sloping side wall and a yolk receiving cup whereby when said receptacle is held in tilted downward relation said yolk cup will be positioned in a substantially horizontal plane and receive the egg yolk from the body portion of the receptacle and the white will separate from the yolk by spilling over the edge of said yolk cup.

21. An endless driven conveyor, a plurality of egg contents separating receptacles swingably mounted along said conveyor, a supporting member along said conveyor for supporting said receptacles adjacent their outer edges for movement in a horizontal position, said receptacles each comprising a pan portion having a bottom and side walls partially surrounding said bottom, said bottom having an upwardly inclined portion with a yolk cup formation at a free outer edge thereof, said pan portion being adapted to receive the contents of an egg while it is in the horizontal position, said supporting member being interrupted to permit successive receptacles to be tilted downwardly, means for supporting said receptacles in the downwardly tilted position for a sufficient period to permit the egg contents therein to move over said bottom to said yolk cup formation, said yolk cup formation being of a size sufficient to receive the egg yolk and having top edge portions over which the egg white will drain and separate from the yolk by gravity, while said pan portion is in the downwardly tilted position, and said receptacles each having a manually adjustable member thereon which is adapted to be positioned for engagement with said supporting member or which may be moved to a position to permit the receptacle to swing free of said supporting member at a predetermined point along the same.

22. An endless driven conveyor, a plurality of egg contents separating receptacles swingably mounted along said conveyor, a supporting member along said conveyor for supporting said receptacles adjacent their outer edges for movement in a horizontal position, said receptacles each comprising a pan portion having a bottom and side walls partially surrounding said bottom, said bottom having an upwardly inclined portion with a yolk cup formation at a free outer edge thereof, said pan portion being adapted to receive the contents of an egg while it is in the horizontal position, said supporting member being interrupted to permit successive receptacles to be tilted downwardly, means for supporting said receptacles in the downwardly tilted position for a sufficient period to permit the egg contents therein to move over said bottom to said yolk cup formation, said yolk cup formation being of a size sufficient to receive the egg yolk and having top edge portions over which the egg white will drain and separate from the yolk by gravity, while said pan portion is in the downwardly tilted position, and means associated with said receptacles which is manually adjustable to free said receptacles from said supporting member at predetermined points along said supporting member and permit selected receptacles to swing downwardly to a contents dumping position at said points.

References Cited in the file of this patent

UNITED STATES PATENTS

| | | |
|---|---|---|
| 1,747,432 | Eskholme | Feb. 18, 1930 |
| 2,090,963 | Reese | Aug. 24, 1937 |
| 2,229,349 | Sigler | Jan. 21, 1941 |
| 2,443,188 | Hodson | June 15, 1948 |
| 2,521,907 | Gill | Sept. 12, 1950 |